US012689404B2

(12) United States Patent
Min et al.

(10) Patent No.: US 12,689,404 B2
(45) Date of Patent: Jul. 21, 2026

(54) ELECTRONIC DEVICE FOR CONTROLLING OUTPUT OF POWER AMPLIFIER

(71) Applicant: SAMSUNG ELECTRONICS CO., LTD., Suwon-si (KR)

(72) Inventors: Jungsik Min, Suwon-si (KR); Youngjin Kang, Suwon-si (KR); Jinseong Park, Suwon-si (KR); Dongil Son, Suwon-si (KR); Seunghee Son, Suwon-si (KR); Kyoungsik Yoon, Suwon-si (KR); Sanghyun Han, Suwon-si (KR); Wonhyung Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 326 days.

(21) Appl. No.: 18/595,423

(22) Filed: Mar. 5, 2024

(65) Prior Publication Data

US 2024/0204820 A1      Jun. 20, 2024

Related U.S. Application Data

(63) Continuation of application No. PCT/KR2022/012891, filed on Aug. 29, 2022.

(30) Foreign Application Priority Data

Oct. 18, 2021    (KR) ......................... 10-2021-0138769
Oct. 27, 2021    (KR) ......................... 10-2021-0144360

(51) Int. Cl.
*H04B 1/401*        (2015.01)
*H04L 5/00*         (2006.01)
*H04B 1/04*         (2006.01)

(52) U.S. Cl.
CPC ........... *H04B 1/401* (2013.01); *H04L 5/0048* (2013.01); *H04B 2001/0416* (2013.01)

(58) Field of Classification Search
CPC .. H04B 1/401; H04B 2001/0416; H04B 1/00; H04B 1/04; H04L 5/0048; H04L 5/00
See application file for complete search history.

(56) References Cited

U.S. PATENT DOCUMENTS 8,724,488 B2     5/2014   Shin et al.
9,198,141 B2    11/2015   Papasakellariou et al.
(Continued)

FOREIGN PATENT DOCUMENTS

CN        110891305 A        3/2020
CN        112789900 A        5/2021
(Continued)

OTHER PUBLICATIONS

International Search Report mailed Dec. 15, 2022 and Written Opinion for PCT/KR2022/012891.

*Primary Examiner* — Curtis A Kuntz
(74) *Attorney, Agent, or Firm* — CANTOR COLBURN LLP

(57) ABSTRACT

An electronic device includes an antenna, a radio frequency front end (RFFE) connected to the antenna through an electrical path and including a power amplifier (PA). The electronic device includes a control circuit operably coupled to the RFFE and configured to control the output of the PA in order to transmit a sounding reference signal (SRS) based on a first value which is a target transmit (Tx) power value of the SRS to be transmitted to a base station through the antenna, a second value for compensating a power loss caused by the electric path when providing the SRS to the antenna through the electric path, and whether a third value obtained based on the first value and the second value is less (Continued)

than or equal to a reference value or greater than the reference value.

20 Claims, 5 Drawing Sheets

(56)                    References Cited

U.S. PATENT DOCUMENTS

| | | | | |
|---|---|---|---|---|
| 9,326,258 | B2 * | 4/2016 | Takaoka .............. | H04W 52/346 |
| 9,955,479 | B2 | 4/2018 | Kim et al. | |
| 11,026,189 | B2 | 6/2021 | Vintola et al. | |
| 11,211,958 | B2 | 12/2021 | Hitomi et al. | |
| 2016/0105151 | A1 * | 4/2016 | Langer ................ | H04B 1/0475 |
| | | | | 330/295 |
| 2018/0368078 | A1 * | 12/2018 | Vintola ................ | H04L 5/0048 |
| 2018/0368083 | A1 | 12/2018 | Yang et al. | |
| 2019/0214945 | A1 | 7/2019 | Lehtola | |

FOREIGN PATENT DOCUMENTS

| | | | | | |
|---|---|---|---|---|---|
| JP | 2020145613 | A | 9/2020 | | |
| JP | 2020529143 | A | 10/2020 | | |
| KR | 20160149886 | A | 12/2016 | | |
| KR | 101697884 | B1 | 1/2017 | | |
| KR | 101923455 | B1 | 11/2018 | | |
| KR | 20200028914 | A | 3/2020 | | |
| KR | 20200105435 | A | 9/2020 | | |
| KR | 102337336 | B1 | 12/2021 | | |
| WO | 2020162643 | A1 | 8/2020 | | |
| WO | WO-2021186417 | A1 * | 9/2021 | ............ | H04B 7/063 |

* cited by examiner

ELECTRONIC DEVICE FOR CONTROLLING OUTPUT OF POWER AMPLIFIER

CROSS-REFERENCE TO RELATED APPLICATIONS

This application s a continuation of International Application No. PCT/KR2022/012891 designating the United States, filed on Aug. 29, 2022, in the Korean Intellectual Property Receiving Office and claiming priority to Korean Patent Application Nos. 10-2021-0138769, filed on Oct. 18, 2021, and 10-2021-0144360, filed on Oct. 27, 2021, in the Korean Intellectual Property Office, the disclosures of each of which are incorporated by reference herein in their entireties.

BACKGROUND

Field

The descriptions below relate to an electronic device that controls power output from a power amplifier (PA) for transmission of a signal.

Description of Related Art

An electronic device may transmit a sounding reference signal (SRS) to the base station to identify a state of an uplink channel. The base station may transmit information on the state of the uplink channel to the electronic device based on the SRS. The electronic device may obtain information in which multiple path fading, scattering, Doppler effect, and power loss of an uplink signal are combined by transmitting the SRS to the base station and receiving the information from the base station.

SUMMARY

An electronic device is provided. The electronic device may include an antenna. The electronic device may include a radio frequency front end (RFFE) including a power amplifier (PA) and connected with the antenna through an electric path. The electronic device may include a control circuit operably coupled with the RFFE. The control circuit may be configured to identify a first value which is a target transmit (Tx) power value of a sounding reference signal (SRS) to be transmitted to a base station through the antenna. The control circuit may be configured to identify a second value for compensating a power loss caused when providing the SRS to the antenna through the electric path. The control circuit may be configured to obtain a third value, based on the first value and the second value. The control circuit may be configured to, in response to identifying that the third value is less than or equal to a reference value, transmit the SRS to the base station through the antenna by using the PA, which outputs the third value. The control circuit may be configured to, in response to identifying that the third value is greater than the reference value, transmit the SRS to the base station through the antenna by using the PA, outputs the reference value.

An electronic device is provided. The electronic device may include a plurality of antennas including a first antenna and a second antenna. The electronic device may include a radio frequency front end (RFFE), connected with the first antenna through a first electric path and connected with the second antenna through a second electrical path, including a first power amplifier (PA) for the first antenna and a second PA for the second antenna. The electronic device may include a control circuit operably coupled with the RFFE. The control circuit may be configured to identify a first value that is a target transmit (Tx) power of a sounding reference signal (SRS) to be transmitted to a base station. The control circuit may be configured to identify a second value that is a power loss value caused when providing the SRS to the first antenna through the first electric path. The control circuit may be configured to identify a third value for compensating a power lass caused when providing, through the second electric path to the second antenna, the SRS to be transmitted to the base station. The control circuit may be configured to obtain a fourth value, based on the first value, the second value, and the third value. The control circuit may be configured to, in response to identifying that the fourth value is less than or equal to a reference value, transmit, to the base station through the second antenna, the SRS by using the PA, which outputs the fourth value. The control circuit may be configured to, in response to identifying that the fourth value is greater than the reference value, transmit, to the base station through the second antenna, the SRS by using the PA, which outputs the reference value.

An electronic device is provided. The electronic device may include an antenna. The electronic device may include a radio frequency front end (RFFE), connected with the antenna through an electric path, including a power amplifier (PA). The electronic device may include a control circuit operably coupled with the RFFE. The control circuit may be configured to, on a condition that a target transmit (Tx) power value of a sounding reference signal (SRS) to be transmitted to a base station through the antenna is within first range configured with values less than reference value, transmit, through the antenna to the base station, the SRS, based on controlling the PA to output power changed according to change of the target Tx power value. The control circuit may be configured to, on a condition that the target Tx power value of the SRS to be transmitted to the base station through the antenna is within second range configured with values greater than or equal to the reference values, transmit, through the antenna to the base station, the SRS, based on controlling the PA to output power maintained independently from the change of the target Tx power value.

DETAILED DESCRIPTION

Figure 1:
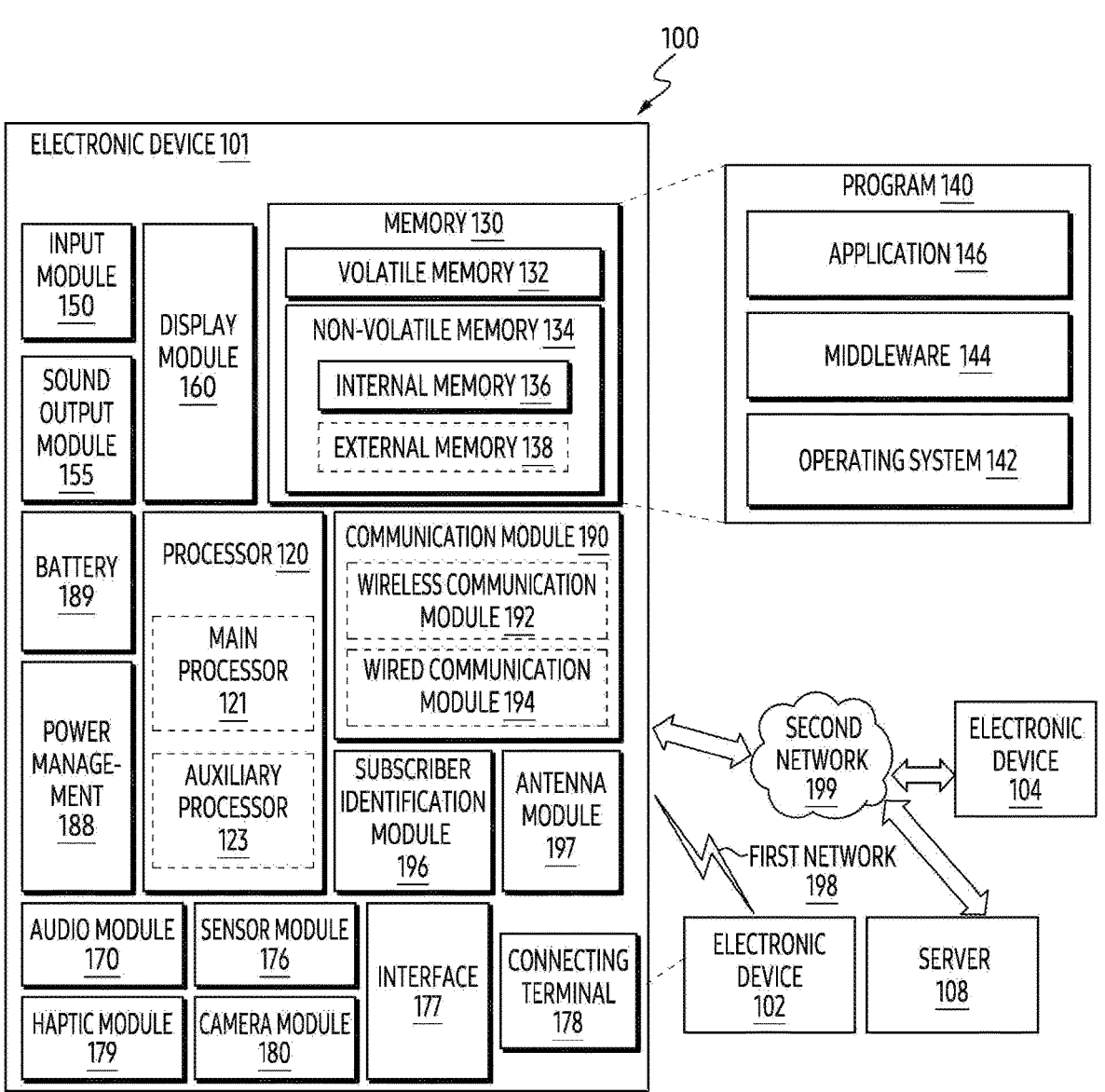
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device may transmit a sounding reference signal (SRS) to a base station through a plurality of antennas in the electronic device. The SRS transmitted to the base station may be respectively provided to the plurality of antennas, through electrical paths respectively connected with a radio frequency front end (RFFE), in the electronic device. For example, the SRS may be provided to a first antenna from among the plurality of antennas through a first electrical path from among the electrical paths, and may be provided to a second antenna from among the plurality of antennas through a second electrical path from among the electrical paths. Since the first electrical path and the second electrical path are disposed at different positions and have different characteristics, a power loss caused (by the first electrical path) when providing the SRS to the first antenna through the first electrical path may be different from a power loss caused (by the second electrical path) when providing the SRS to the second antenna through the second electrical path. The electronic device may control a transmit power of the SRS based on applying an offset to a PA (power amplifier) in the RFFE to compensate for this difference.

On the other hand, a power outputted from the PA may be required to be within an appropriate range to prevent the PA from burning and close to a target transmit power of the SRS. Therefore, a control method of the PA that transmits the SRS by applying the offset within a state capable of using maximally the appropriate range may be required.

Figure 2:
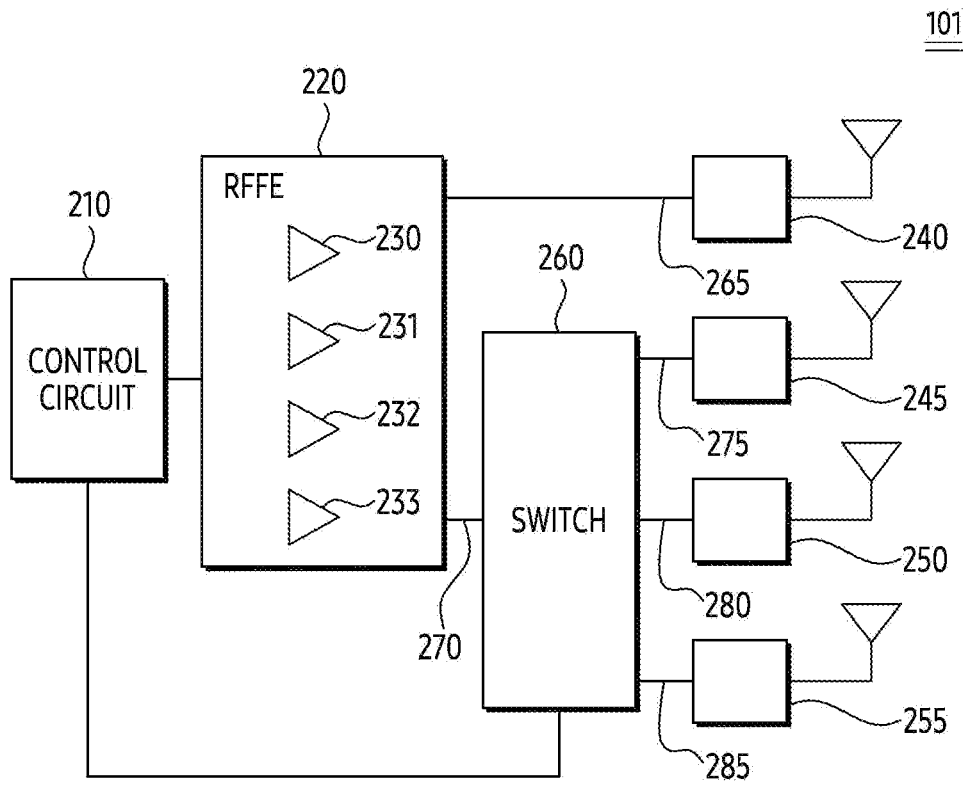
FIG. 2 is a simplified block diagram of an electronic device according to an embodiment.

FIG. 2 is a simplified block diagram of an electronic device according to an embodiment. The electronic device may be the electronic device 101 illustrated in FIG. 1.

Referring to FIG. 2, the electronic device 101 may include a control circuit 210, a radio frequency front end (RFFE) 220, a plurality of antennas including a first antenna 240, a second antenna 245, a third antenna 250 and a fourth antenna 255, a switch 260 and a plurality of electrical paths including a first electrical path 265, a second electrical path 270, a third electrical path 275, a fourth electrical path 280 and a fifth electrical path 285. According to embodiments, some of the control circuit 210, RFFE 220, the plurality of antennas including the first antenna 240, the second antenna 245, the third antenna 250, and the fourth antenna 255 and the switch 260 may not be included in the electronic device 101.

In an embodiment, the control circuit 210 may be used to control the RFFE 220 and the switch 260. For example, the control circuit 210 may be operatively coupled to the RFFE 220 and operatively coupled to the switch 260.

In an embodiment, the control circuit 210 may include at least a part of the processor 120 illustrated in FIG. 1. For example, the control circuit 210 may include at least a part of the main processor 121 illustrated in FIG. 1. For example, the control circuit 210 may include at least a part of the communication processor described in FIG. 1. However, the control circuit 210 is not limited thereto.

In an embodiment, the control circuit 210 may include at least a part of the communication module 190 illustrated in FIG. 1. However, the control circuit 210 is not limited thereto.

Figure 3:
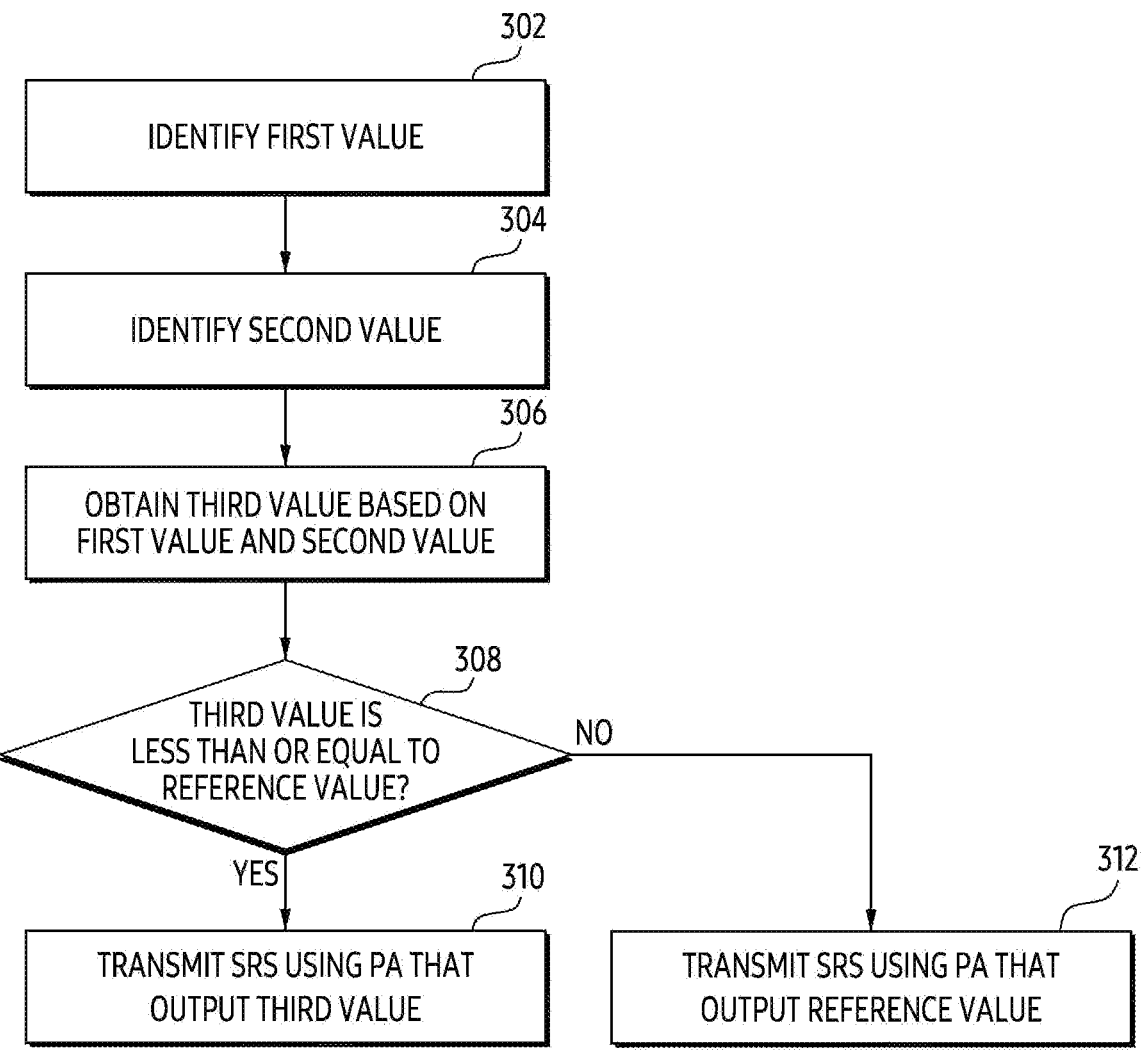
FIG. 3 is a flowchart illustrating a method of controlling a power amplifier (PA) according to an embodiment.
Figure 4:
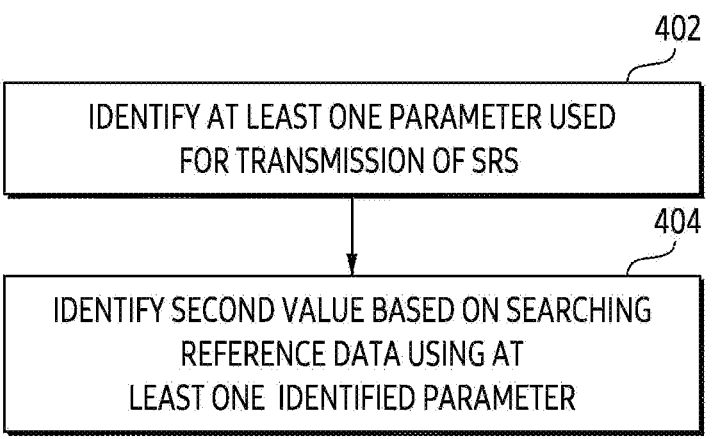
FIG. 4 is a flowchart illustrating a method of identifying a value for adaptively compensating for power loss due to an electrical path according to at least one parameter used for transmitting of a sounding reference signal (SRS) according to an embodiment.
Figure 5:
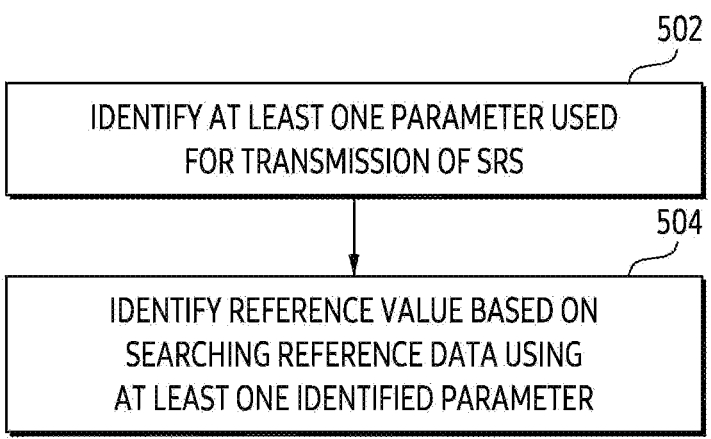
FIG. 5 is a flowchart illustrating a method of adaptively identifying a reference value according to at least one parameter used for transmitting SRS according to an embodiment.

In an embodiment, the control circuit 210 may be configured to execute operations illustrated through the descriptions of FIGS. 3 to 5.

In an embodiment, RFFE 220 may include components for processing a signal transmitted through at least one of the plurality of antennas including the first antenna 240, the second antenna 245, the third antenna 250, and the fourth antenna 255 or a signal received through at least one of the plurality of antennas including the first antenna 240, the second antenna 245, the third antenna 250, and the fourth antenna 255. For example, the RFFE 220 may include at least one filter, at least one power amplifier (PA), at least one of switch or duplexer for processing the signal transmitted through at least one of the plurality of antennas or the signal received through at least one of the plurality of antennas. For example, the at least one PA may include a first PA 230 for controlling, setting, or changing transmission power of a signal transmitted through the first antenna 240. For example, the at least one PA may include at least one of a second PA 231 for controlling, setting, or changing transmission power of a signal transmitted through the second antenna 245, a third PA 232 for controlling, setting, or changing transmission power of a signal transmitted through the third antenna 250 or a fourth PA 233 for controlling, setting, or changing transmission power of a signal transmitted through the fourth antenna 255.

In an embodiment, a supply voltage (e.g., Vcc) for an operating range of the at least one PA used to control, set, or change the transmission power may be set by the control circuit 210.

In an embodiment, the control circuit 210 may set the supply voltage based on average power tracking (APT). For example, the APT may be used to reduce unnecessary power consumption by the at least one PA. For example, the APT may be used to dynamically or adaptively change the supply voltage based on the average output power of the at least one PA. For example, the APT may adaptively change the supply voltage whenever the average output voltage is changed. For example, the APT may be used to set the supply voltage while the transmission power set by the at least one PA is within the first range. For example, the APT may be used to set the supply voltage while the transmission power is within the first range of 18 (dBm) or less. However, it is not limited thereto.

In an embodiment, the control circuit 210 may set the supply voltage based on envelope tracking (ET). For example, the ET may be used to solve a high peak-to-average power ratio (PAPR) and high average output power that the APT cannot address. For example, the ET may be used to dynamically or adaptively change the supply voltage based on a radio frequency (RF) modulation amplitude (e.g., an instantaneous output voltage) instead of the average output power. For example, the ET may be used to set the supply voltage while the transmission power set by the at least one PA is within a second range distinguished from the first range. For example, the ET may be used to set the supply voltage while the transmit power is within the second range of greater than 18 (dBm). However, it is not limited thereto.

In an embodiment, the plurality of antennas including the first antenna 240, the second antenna 245, the third antenna 250, and the fourth antenna 255 may be used to transmit a signal to an external electronic device (e.g., a base station) or to receive a signal from the external electronic device.

For example, the first antenna 240 may be used to transmit a signal to the external electronic device. For example, the first antenna 240 may be used to transmit the signal provided from the RFFE 220 through a first electrical path 265 between the RFFE 220 and the first antenna 240 to the external electronic device. In an embodiment, the first antenna 240 may be an antenna designated for signal transmission from among signal transmission and signal reception. However, it is not limited thereto.

For example, the second antenna 245 may be an antenna electrically separated from the first antenna 240. For example, the second antenna 245 may be mainly used to receive a signal from the external electronic device and may be auxiliary used to transmit a signal to the external electronic device. For example, the second antenna 245 may be used for transmitting at least one designated signal from among a plurality of signals transmitted from the electronic device 101 to the external electronic device. For example, the at least one designated signal may include a sounding reference signal (SRS). For example, the SRS may be used for estimating an uplink channel. For example, the SRS may be used to identify at least one beam to be used to transmit an uplink signal. For example, the SRS may be used to identify a spatial domain transmission filter to be applied for transmission of an uplink signal. However, the usage of SRS is not limited thereto. Meanwhile, when the second antenna 245 is used for transmission of the SRS, the second antenna 245 may be used to transmit the SRS provided from the RFFE 220, through the second electrical path 270 between the RFFE 220 and the switch 260 and through the third electrical path 275 between the switch 260 and the second antenna 245, to the external electronic device. Meanwhile, in an embodiment, the switch 260 may be used to electrically connect the second electrical path 270 and the third electrical path 275 under the control of the control circuit 210.

For example, the third antenna 250 may be an antenna electrically separated from the first antenna 240 and the second antenna 245. For example, the third antenna 250 may be mainly used to receive a signal from the external electronic device and may be auxiliary used to transmit a signal to the external electronic device. For example, the third antenna 250 may be used for transmitting the at least one designated signal including the SRS from among a plurality of signals transmitted from the electronic device 101 to the external electronic device. In an embodiment, when the third antenna 250 is used for transmitting the SRS, the third antenna 250 may be used to transmit the SRS provided from the RFFE 220, through the second electrical path 270 between the RFFE 220 and the switch 260 and through the fourth electrical path 280 between the switch 260 and the third antenna 250, to the external electronic device. Meanwhile, in an embodiment, the switch 260 may be used to electrically connect the second electrical path 270 and the fourth electrical path 280 under the control of the control circuit 210.

For example, the fourth antenna 255 may be an antenna electrically separated from the first antenna 240, the second antenna 245, and the third antenna 250. For example, the fourth antenna 255 may be mainly used to receive a signal from the external electronic device and may be auxiliary used to transmit a signal to the external electronic device. For example, the fourth antenna 255 may be used for transmitting the at least one designated signal including the SRS from among a plurality of signals transmitted from the electronic device 101 to the external electronic device. In an embodiment, when the fourth antenna 255 is used for transmission of the SRS, the fourth antenna 255 may be used to transmit the SRS provided from the RFFE 220, through the second electrical path 270 between the RFFE 220 and the switch 260 and through the fifth electrical path 285 between the switch 260 and the fourth antenna 255, to the external electronic device. Meanwhile, in an embodiment, the switch 260 may be used to electrically connect the second electrical path 270 and the fifth electrical path 285 under the control of the control circuit 210.

According to embodiments, the switch 260 may not be included in the electronic device 101. When the switch 260 is not included in the electronic device 101, the second electrical path 270 and the third electrical path 275 may be formed as one electrical path, the second electrical path 270 and the fourth electrical path 280 may be formed as one electrical path, and the second electrical path 270 and the fifth electrical path 285 may be formed as one electrical path. However, it is not limited thereto.

Although not shown in FIG. 2, depending on the distance between the switch 260 and the third electrical path 275, the switch 260 and the fourth electrical path 280, or the switch 260 and the fifth electrical path 285, the third electrical path 275, the fourth electrical path 280, or the fifth electrical path 285 may be formed of an FRC (flexible printed circuit board (FPCB) radio frequency (RF) cable). However, it is not limited thereto.

FIG. 3 is a flowchart illustrating a method of controlling a power amplifier (PA) according to an embodiment. The method may be executed by the electronic device 101 illustrated in FIG. 1, the main processor 121 illustrated in FIG. 1, the coprocessor 123 illustrated in FIG. 1, the communication module 190 illustrated in FIG. 1, the electronic device 101 illustrated in FIG. 2, or the control circuit 210 illustrated in FIG. 2.

Referring to FIG. 3, in operation 302, the control circuit 210 may identify a first value that is a target transmit power value of a sounding reference signal (SRS) to be transmitted to the base station through the second antenna 245. For example, the first value may be identified based on transmission power of a signal transmitted through a physical uplink shared channel (PUSCH). However, it is not limited thereto.

In operation 304, the control circuit 210 may identify a second value for compensating for power loss caused (by an electrical path) when the SRS to be transmitted to the base station is provided to the second antenna 245 through the electrical path. For example, the electrical path may be a path used to transfer the SRS from the RFFE 220 to the antenna 245 and may include a second electrical path 270 and a third electrical path 275. For example, the second value may mean a power loss value caused (by the electrical path) when the SRS is provided to the second antenna 245 through the electrical path. For example, the second value may mean a difference value between a power loss caused (by another electrical path (e.g., the first electrical path 265)) when the SRS is provided to the first antenna 240 through the another electrical path and a power loss caused (by the electrical path (e.g., the second electrical path 270 and the third electrical path 275)) when the SRS is provided to the second antenna 245 through the electrical path. For example, the difference value may be referred to as a power offset or an SRS offset in terms of compensating for power loss due to transmission of the SRS through the electrical path based on the power loss due to transmission of the SRS through the other electrical path. However, it is not limited thereto. For example, the second value may be differently identified according to a range in which a frequency used for the transmission of the SRS is included. For example, the second value may be differently identified according to a band used for the transmission of the SRS. For example, the second value may be differently identified according to whether the second PA 231 used for the transmission of the SRS is controlled based on the APT or the ET. However, it is not limited thereto.

The identification of the second value may be performed independently from or in regardless of whether the second PA 231 is controlled based on the APT or the ET.

In operation 306, the control circuit 210 may obtain a third value based on the first value and the second value. For example, when the second value is the power loss value caused (by the electrical path (e.g., the second electrical path 270 and the third electrical path 275)) when the SRS is provided to the second antenna 245 through the electrical path, the control circuit 210 may obtain the third value by summing the first value and the second value. For another example, when the second value is the difference value above, the control circuit 210 may obtain the third value by summing the power loss value caused (by the other electrical path) when the SRS is provided to the first antenna 240 through the other electrical path, the first value, and the second value. However, it is not limited thereto.

In operation 308, the control circuit 210 may compare the third value with a reference value. For example, the reference value may mean a value stored in the electronic device 101 to identify a power value output from the second PA 231. For example, the reference value may refer to a maximum power value that the second PA 231 may output under conditions of preventing burnout (or damage) of the second PA 231 or saturation of the second PA 231. For example, the reference value may be differently identified according to a range in which a frequency used for the transmission of the SRS is included. For example, the reference value may be differently identified according to a band used for the transmission of the SRS. For example, the reference value may be differently identified according to a range in which the target transmit power value of the SRS is included. For example, the reference value may be differently identified depending on whether the second PA 231 is controlled based on the APT or the ET. However, it is not limited thereto.

In an embodiment, the control circuit 210 may execute operation 310 on a condition that the third value is equal to or less than the reference value, otherwise execute operation 312.

In operation 310, based on the identification that the third value is equal to or less than the reference value, the control circuit 210 may transmit the SRS to the base station through the second antenna 245 using the second PA 231 outputting the third value. For example, since the third value output from the second PA 231 is a value obtained based on the second value for compensating for the power loss caused (by the electrical path) when the SRS is provided to the second antenna 245 through the electrical path, the SRS may be transmitted to the base station as the target transmit power value.

In operation 312, the control circuit 210 may transmit the SRS to the base station through the second antenna 245 using a second PA 231 that outputs the reference value based on identification that the third value exceeds the reference value. For example, since the second PA 231 outputs the reference value, the control circuit 210 may prevent burnout of the second PA 231 due to the transmission of the SRS. For example, since the second PA 231 outputs the reference value, the SRS may not be transmitted to the base station as the target transmit power value but may be transmitted to the base station as a power value as close as possible to the target transmit power value.

Meanwhile, although not shown in FIG. 3, the control circuit 210 may obtain a fourth value based on a power loss value caused (by the other electrical path) when the SRS is provided to the first antenna 240 through the other electrical path (e.g., the first electrical path 265) to transmit the SRS to the base station through the first antenna 240, and transmit the SRS to the base station through the first antenna 240 using the first PA 230 outputting the fourth value.

Meanwhile, although not shown in FIG. 3, operations identical or similar to the operations illustrated in FIG. 3 may be used when the SRS is transmitted to the base station through the third antenna 250 or the fourth antenna 255.

As described above, the electronic device 101 may identify the transmission power of the SRS based on the comparison between the third value and the reference value. The electronic device 101 may provide enhanced communication performance through such identification.

For example, the electronic device 101 may provide enhanced communication performance more than other electronic devices that apply a power offset such as the second value only when the PA is controlled based on the APT from among the APT and the ET for transmission of the SRS. For example, since the other electronic device does not apply the power offset when controlling the PA based on the ET for transmission of the SRS, a reversal phenomenon, in which transmission power of the SRS transmitted while controlling the PA based on the ET is smaller than transmission power of the SRS transmitted while controlling the PA based on the APT, occurs in the other electronic device. Unlike other electronic devices, since the electronic device 101 according to an embodiment identifies the second value independently of whether the second PA 231 is controlled based on the APT or the ET, obtains the third value based on at least a portion of the second value and compares the third value with the reference value, the reversal phenomenon does not occur in the electronic device 101.

For another example, the electronic device 101 may provide enhanced communication performance compared to other electronic devices that apply a reduced power offset to prevent burnout of the PA when controlling the PA based on the ET for transmission of the SRS. For example, while the other electronic device transmits the SRS based on a transmission power value lower than the target transmit power value due to the application of the reduced power offset, the electronic device 101 provides enhanced communication performance compared to the other electronic devices, since the SRS is transmitted based on the target transmit power value on a condition that the third value is equal to or less than the reference value, and the SRS is transmitted based on a power value that is as close as possible to the target transmit power value on a condition that the third value exceeds the reference value.

Meanwhile, unlike the other electronic devices described above that control the PA to output power that is always changed according to a change in a target transmit power value when transmitting the SRS, the electronic device 101 according to an embodiment may control the second PA 231 to output power maintained independently of the change in the target transmit power value when transmitting the SRS. For example, since the electronic device 101 controls the second PA 231 to output the reference value on a condition that the third value exceeds the reference value, unlike the other electronic devices, the electronic device 101 according to an embodiment may control the second PA 231 to output power that is maintained independently of the change in the target transmit power value when the SRS is transmitted.

FIG. 4 is a flowchart illustrating a method of identifying a value for adaptively compensating for power loss due to an electrical path according to at least one parameter used for transmitting of a sounding reference signal (SRS) according to an embodiment. The method may be executed by the electronic device 101 illustrated in FIG. 1, the main processor 121 illustrated in FIG. 1, the coprocessor 123 illustrated in FIG. 1, the communication module 190 illustrated in FIG. 1, the electronic device 101 illustrated in FIG. 2, or the control circuit 210 illustrated in FIG. 2.

Operations 402 to 404 of FIG. 4 may be related to operation 304 of FIG. 3.

Referring to FIG. 4, in operation 402, the control circuit 210 may identify at least one parameter used for transmitting a sounding reference signal (SRS). For example, the at least one parameter may include at least one of a frequency used for transmitting the SRS or a band used for transmitting the SRS. For example, the control circuit 210 may identify the at least one parameter to identify a second value (e.g., the second value defined through the description of FIG. 3) corresponding to the at least one parameter from reference data to be described later.

In operation 404, the control circuit 210 may identify the second value based on searching for the reference data using the at least one identified parameter. For example, the reference data may be data stored or pre-stored in the electronic device 101 to identify the second value. For example, the reference data may include a plurality of candidate values for identifying the second value. For example, each of the plurality of candidate values may be associated within the reference data with at least one of candidate frequencies that may be used for transmitting the SRS or candidate bands that may be used for transmitting the SRS. For example, the reference data may be represented as shown in Table 1 below.

TABLE 1

| Range of candidate frequencies (Hz) | Second value (dBm) |
|---|---|
| $A_1 \sim A_2$ | $B_1$ |
| $A_3 \sim A_4$ | $B_2$ |
| . . . | . . . |
| $A_{2N-1} \sim A_{2N}$ | $B_N$ |

Table 1 is an example of the reference data including a relationship between candidate frequencies in one of the candidate bands from among the candidate bands that may be used for transmission of the SRS and the second value, and N is a natural number.

In an embodiment, the control circuit 210 may identify a first candidate value ($B_1$) from among a plurality of candidate values (e.g. $B_1$ to $B_N$ in Table 1) in the reference data as the second value on a condition that a frequency used for transmitting the SRS is within a first range (e.g. $A_1 \sim A_2$ in Table 1) and identify a second candidate ($B_2$) value distinguished from the first candidate value from among the plurality of candidate values (e.g. $B_1$ to $B_N$ in Table 1) in the reference data as the second value on a condition that a frequency used for transmitting the SRS is within a second range (e.g. $A_3 \sim A_4$ in Table 1) distinguished from the first range.

In an embodiment, the control circuit 210 may identify a first candidate value from among a plurality of candidate values in the reference data as the second value on a condition that the band used for transmitting the SRS is the first band and identify a second candidate value distinguished from the first candidate value from among the plurality of candidate values in the reference data as the second value on a condition that the band used for transmitting the SRS is a second band distinguished from the first band. However, it is not limited thereto.

As described above, the electronic device 101 may provide enhanced communication performance by searching for the reference data stored in the electronic device 101 using the at least one parameter used for transmitting the SRS. For example, based on the transmission of the SRS, since user data may be transmitted to the base station based on a modulation and coding scheme (MCS) suitable for an uplink state from the electronic device 101 to the base station, the electronic device 101 may provide enhanced communication performance (e.g., throughput).

FIG. 5 is a flowchart illustrating a method of adaptively identifying a reference value according to at least one parameter used for transmitting SRS according to an embodiment. The method may be executed by the electronic device 101 illustrated in FIG. 1, the main processor 121 illustrated in FIG. 1, the coprocessor 123 illustrated in FIG. 1, the communication module 190 illustrated in FIG. 1, the electronic device 101 illustrated in FIG. 2, or the control circuit 210 illustrated in FIG. 2.

Operation 502 and operation 504 of FIG. 5 may be related to operation 308 of FIG. 3.

Referring to FIG. 5, in operation 502, the control circuit 210 may identify at least one parameter used for transmitting a sounding reference signal (SRS). For example, the at least one parameter may include at least one of a target transmit power value of the SRS, a frequency used for transmission of the SRS, or a band used for transmission of the SRS. For example, the control circuit 210 may identify the at least one parameter to identify a reference value (e.g., the reference value defined through the description of FIG. 3) corresponding to the at least one parameter from reference data to be described later.

In operation 504, the control circuit 210 may identify the reference value based on searching for the reference data using the at least one identified parameter. For example, the reference data may be data stored or pre-stored in the electronic device 101 to identify the reference value. For example, the reference data may include a plurality of candidate reference values for identifying the reference value. For example, each of the plurality of candidate reference values may be associated with at least one of candidate frequencies that may be used for transmitting the SRS, candidate bands that may be used for transmitting the SRS, or candidate target transmit power values of the SRS, within the reference data.

As described above, an electronic device (e.g., the electronic device 101) may include a first antenna (e.g., the second antenna 245); a radio frequency front end (RFFE) (e.g., RFFE 220), including a first power amplifier (PA) (e.g., the second PA 231), and connected with the first antenna through a first electric path (e.g., the second electrical path 270 and the third electrical path 275); and a control circuit (e.g., the control circuit 210) operably coupled with the RFFE. According to an embodiment, the control circuit may be configured to identify a first value which is a target transmit (Tx) power value of a sounding reference signal (SRS) to be transmitted to a base station through the first antenna. According to an embodiment, the

TABLE 2

| Plurality of candidate reference values (dBm) | | | | | | | | | | | |
| First band | Second band | | | | | Third band | | | | | |
| $A_1\sim A_2$ (Hz) | | $A_3\sim A_4$ (Hz) | | $A_4\sim A_5$ (Hz) | | $A_5\sim A_6$ (Hz) | | $A_7\sim A_8$ (Hz) | | $A_8\sim A_9$ (Hz) | |
| $B_1\sim B_2$ (dBm) | $B_2\sim B_3$ (dBm) | $B_1\sim B_2$ (dBm | $B_2\sim B_3$ (dBm | $B_1\sim B_2$ (dBm | $B_2\sim B_3$ (dBm | $B_1\sim B_2$ (dBm | $B_2\sim B_3$ (dBm | $B_1\sim B_2$ (dBm | $B_2\sim B_3$ (dBm | $B_1\sim B_2$ (dBm | $B_2\sim B_3$ (dBm |
| $C_1$ | $C_1$ | $C_2$ | $C_3$ | $C_2$ | $C_4$ | $C_2$ | $C_4$ | $C_2$ | $C_3$ | $C_2$ | $C_4$ |

In Table 2, each of $A_1$ to $A_9$ is a candidate frequency, each of $B_1$, $B_2$ and $B_3$ is a candidate target transmit power value, and each of $C_1$, $C_2$, $C_3$, and $C_4$ is a candidate reference value.

In an embodiment, on a conditions in which the frequency used for transmitting the SRS is within a first range (e.g., $A_3\sim A_4$ in Table 2) and the target transmit power value of the SRS is within a second range (e.g., $B_1\sim B_2$ in Table 2), the control circuit 210 may identify the reference value as a first candidate reference value (e.g., $C_2$ in Table 2) from among the plurality of candidate reference values (e.g., $C_1$, $C_2$, $C_3$, and $C_4$ in Table 2), and on a conditions in which the frequency used for transmitting the SRS is within a third range (e.g., $A_7\sim A_8$ in Table 2) distinguished from the first range and the target transmit power value of the SRS is within a fourth range (e.g., $B_2\sim B_3$ in Table 2) distinguished from the second range, the control circuit 210 may identify the reference value as a second candidate reference value (e.g., $C_3$ in Table 2) distinguished from the first candidate reference value from among the plurality of candidate reference values (e.g., $C_1$, $C_2$, $C_3$, and $C_4$ in Table 2).

As described above, the electronic device 101 may provide enhanced communication performance by searching for the reference data stored in the electronic device 101 using the at least one parameter used for transmitting the SRS. For example, since user data may be transmitted to the base station based on an MCS suitable for an uplink state from the electronic device 101 to the base station based on the SRS transmission, the electronic device 101 may provide enhanced communication performance.

The above-described descriptions of FIGS. 3 to 5 include operations of the electronic device 101 when transmitting SRS, but this is for convenience of description. The methods illustrated through the description of FIGS. 3 to 5 may be applied not only to the SRS but also to other signals.

According to the above-described examples, an electronic device may provide enhanced communication performance, by controlling a power amplifier (PA) based on comparing an identified power using a target transmit power and a power to compensate for a power loss caused by an electrical path in the electronic device with the reference power, for a transmission of a sounding reference signal (SRS).

control circuit may be configured to identify a second value for compensating a power loss caused (by the first electric path) when providing the SRS to the first antenna through the first electric path. According to an embodiment, the control circuit may be configured to obtain a third value, based on the first value and the second value. According to an embodiment, the control circuit may be configured to, in response to identifying that the third value is less than or equal to a reference value, transmit the SRS to the base station through the first antenna by using the first PA, which outputs the third value. According to an embodiment, the control circuit may be configured to, in response to identifying that the third value is greater than the reference value, transmit the SRS to the base station through the first antenna by using the first PA, which outputs the reference value.

According to an embodiment, the electronic device may further include a second antenna (e.g., the first antenna 240) electrically separated from the first antenna. According to an embodiment, the RFFE may be connected with the second antenna through a second electric path (e.g., the first electrical path 265) distinct from the first electric path and further include a second PA (e.g., the first PA 230) for the second antenna. According to an embodiment, the second value may be a difference value between the power loss caused (by the first electric path) when providing the SRS to the first antenna through the first electric path and another power loss caused (by the second electric path) when providing the SRS to the second antenna through the second electric path. For example, the second antenna from among the first antenna and the second antenna may be an antenna used for a transmission of a signal. For example, the first antenna from among the first antenna and the second antenna may be an antenna used for a reception of a signal and the transmission of the SRS.

According to an embodiment, the control circuit may be configured to, on condition that frequency used for the transmission of the SRS is within first range, identify a first candidate value from among a plurality of candidate values as the second value. According to an embodiment, the control circuit may be configured to, on condition that the frequency is within second range distinct from the first range, identify a second candidate value distinct from the first candidate value from among the plurality of candidate values as the second value. For example, the control circuit may be configured to, on condition that the frequency is within the first range, identify a first candidate reference value from among a plurality of candidate reference values as the reference value. For example, the control circuit may be configured to, on condition that the frequency is within the second range, identify a second candidate reference value distinct from the first candidate reference value from among the plurality of candidate reference values as the reference value.

According to an embodiment, the control circuit may be configured to, on condition that a band used for the transmission of the SRS is a first band, identify a first candidate value from among a plurality of candidate values as the second value. According to an embodiment, the control circuit may be configured to, on condition that the band is a second band distinct from the first band, identify a second candidate value distinct from the first candidate value from among the plurality of candidate values as the second value. For example, the control circuit may be configured to, on condition that the band is the first band, identify a first candidate reference value from among a plurality of candidate reference values as the reference value. For example, the control circuit may be configured to, on condition that the band is the second band, identify a second candidate reference value distinct from the first candidate reference value from among the plurality of candidate reference values as the reference value.

According to an embodiment, the control circuit may be configured to, on condition that the first value is within first range, identify the reference value as a first candidate reference value from among a plurality of candidate reference values. According to an embodiment, the control circuit may be configured to, on condition that the first value is within second range distinct from the first range, identify the reference value as a second candidate reference value distinct from the first candidate reference value from among the plurality of candidate reference values. For example, the first range may be configured with first power values that are capable of being output from the first PA, which is controlled based on average power tracking (APT). For example, the second range may be configured with second power values that are capable of being output from the first PA, which is controlled envelope tracking (ET).

According to an embodiment, the control circuit may be configured to obtain the third value by adding the second value to the first value.

According to the above-described embodiment, an electronic device (e.g., the electronic device 101) may include a plurality of antennas including a first antenna (e.g., the first antenna 240) and a second antenna (e.g., the second antenna 245), a radio frequency front end (RFFE) (e.g., RFFE 220), connected with the first antenna through a first electric path (e.g., the first electrical path 265) and connected with the second antenna through a second electrical path (e.g., the second electrical path 270 and a third electrical path 275), including a first power amplifier (PA) (e.g., first PA 230) for the first antenna and a second PA (e.g., second PA 231) for the second antenna and a control circuit (e.g., the control circuit 210) operably coupled with the RFFE. According to an embodiment, the control circuit may be configured to identify a first value that is a target transmit (Tx) power of a sounding reference signal (SRS) to be transmitted to a base station. According to an embodiment, the control circuit may be configured to identify a second value that is a power loss value caused (by the first electric path) when providing, through the first electric path to the first antenna, the SRS to be transmitted to the base station. According to an embodiment, the control circuit may be configured to identify a third value for compensating a power lass caused (by the second electric path) when providing, through the second electric path to the second antenna, the SRS to be transmitted to the base station. According to an embodiment, the control circuit may be configured to obtain a fourth value, based on the first value, the second value, and the third value. According to an embodiment, the control circuit may be configured to, in response to identifying that the fourth value is less than or equal to a reference value, transmit, to the base station through the second antenna, the SRS by using the PA outputting the fourth value. According to an embodiment, the control circuit may be configured to, in response to identifying that the fourth value is greater than the reference value, transmit, to the base station through the second antenna, the SRS by using the PA outputting the reference value.

According to an embodiment, the third value may correspond to a difference between a power loss value caused (by the first electric path) when providing the SRS through the first electric path to the first antenna and a power loss value caused (by the second electric path) when providing the SRS through the second electric path to the second antenna.

According to an embodiment, the first antenna from among the first antenna and the second antenna may be used for transmitting at least one signal distinct from the SRS to an external electronic device. According to an embodiment, the second antenna from among the first antenna and the second antenna may be used for receiving a signal from the external electronic device.

According to an embodiment, the control circuit may be configured to, on condition that a frequency used for the transmission of the SRS is within first range, identify a first candidate value from among a plurality of candidate values as the third value. According to an embodiment, the control circuit may be configured to, on condition that the frequency is within second range distinct from the first range, identify a second candidate value distinct from the first candidate value from among the plurality of candidate values as the third value. For example, the control circuit may be configured to, on condition that the frequency is within the first range, identify a first candidate reference value from among a plurality of candidate reference values as the reference value. For example, the control circuit may be configured to, on condition that the frequency is within the second range, identify a second candidate reference value from among the plurality of candidate reference values as the reference value.

According to an embodiment, the control circuit may be configured to, on condition that a band used for the transmission of the SRS is a first band, identify a first candidate value from among a plurality of candidate values as the third value. According to an embodiment, the control circuit may be configured to, on condition that the band is a second band distinct from the first band, identify a second candidate value distinct from the first candidate value from among the plurality of candidate values as the third value. For example, the control circuit may be configured to, on condition that the band is the first band, identify, as the reference value, a first candidate reference value from among a plurality of candidate reference values. For example, the control circuit may be configured to, on condition that the band is the second band, identify, as the reference value, a second candidate reference value distinct from the first candidate reference value from among the plurality of candidate reference values.

According to an embodiment, the control circuit may be configured to, on condition that the first value is within first range configured with first power values capable of outputting from the second PA controlled based on average power tracking (APT), identify the reference value as a first candidate reference value from among a plurality of candidate reference values. According to an embodiment, the control circuit may be configured to, on condition that the first value is within second range configured with second power values capable of outputting from the second PA controlled based on envelope tracking (ET), identify the reference value as a second candidate reference value distinct from the first candidate reference value from among the plurality of candidate reference values.

According to an embodiment, the control circuit may be configured to obtain a fifth value, based on the first value and the second value and transmit, through the first antenna to the base station, the SRS by using the first PA outputting the fifth value.

As described above, an electronic device (e.g., the electronic device 101) may include an antenna (e.g., the second antenna 245), a radio frequency front end (RFFE) (e.g., RFFE 220), connected with the antenna through an electric path (e.g., the second electrical path 270 and the third electrical path 275), including a power amplifier (PA) (e.g., the second PA 231), and a control circuit (e.g., control circuit 210) operably coupled with the RFFE. According to an embodiment, the control circuit may be configured to, on condition that a target transmit (Tx) power value of a sounding reference signal (SRS) to be transmitted through the antenna to a base station is within first range configured with values less than reference value, transmit, through the antenna to the base station, the SRS, based on controlling the PA to output power changed according to change of the target Tx power value. According to an embodiment, the control circuit may be configured to, on condition that the target Tx power value of the SRS to be transmitted through the antenna to the base station is within second range configured with values greater than or equal to the reference values, transmit, through the antenna to the base station, the SRS, based on controlling the PA to output power maintained independently from the change of the target Tx power value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first antenna;
a radio frequency front end (RFFE) comprising a first power amplifier (PA) and connected with the first antenna through a first electric path; and
a control circuit operably coupled with the RFFE and configured to:
identify a first value which is a target transmit (Tx) power value of a sounding reference signal (SRS) to be transmitted to a base station through the first antenna,
identify a second value for compensating a power loss caused when providing the SRS to the first antenna through the first electric path,
obtain a third value based on the first value and the second value,
in response to identifying that the third value is less than or equal to a reference value, transmit the SRS to the base station through the first antenna by using the first PA, which outputs the third value, and
in response to identifying that the third value is greater than the reference value, transmit the SRS to the base station through the first antenna by using the first PA, which outputs the reference value.

2. The electronic device of claim 1, further comprising:
a second antenna electrically separated from the first antenna,
wherein the RFFE is further connected with the second antenna through a second electric path distinct from the first electric path and further comprises a second PA for the second antenna, and
wherein the second value is a difference value between the power loss caused when providing the SRS to the first antenna through the first electric path and another power loss caused when providing the SRS to the second antenna through the second electric path.

3. The electronic device of claim 2, wherein the second antenna from among the first antenna and the second antenna is an antenna used for a transmission of a signal, and
wherein the first antenna from among the first antenna and the second antenna is an antenna used for a reception of a signal and the transmission of the SRS.

4. The electronic device of claim 1, wherein the control circuit is configured to:
on condition that a frequency used for the transmission of the SRS is within a first range, identify a first candidate value from among a plurality of candidate values as the second value; and
on condition that the frequency is within a second range distinct from the first range, identify a second candidate value distinct from the first candidate value from among the plurality of candidate values as the second value.

5. The electronic device of claim 4, wherein the control circuit is configured to:
on condition that the frequency is within the first range, identify a first candidate reference value from among a plurality of candidate reference values as the reference value; and
on condition that the frequency is within the second range, identify a second candidate reference value distinct from the first candidate reference value from among the plurality of candidate reference values as the reference value.

6. The electronic device of claim 1, wherein the control circuit is configured to:
on condition that a band used for the transmission of the SRS is a first band, identify a first candidate value from among a plurality of candidate values as the second value; and
on condition that the band is a second band distinct from the first band, identify a second candidate value distinct from the first candidate value from among the plurality of candidate values as the second value.

7. The electronic device of claim 6, wherein the control circuit is configured to:
on condition that the band is the first band, identify a first candidate reference value from among a plurality of candidate reference values as the reference value; and
on condition that the band is the second band, identify a second candidate reference value distinct from the first candidate reference value from among the plurality of candidate reference values as the reference value.

8. The electronic device of claim 1, wherein the control circuit is configured to:
on condition that the first value is within a first range, identify the reference value as a first candidate reference value from among a plurality of candidate reference values; and
on condition that the first value is within a second range distinct from the first range, identify the reference value as a second candidate reference value distinct from the first candidate reference value from among the plurality of candidate reference values.

9. The electronic device of claim 8, wherein the first range is configured with first power values that are capable of being output from the first PA, which is controlled based on average power tracking (APT), and
wherein the second range is configured with second power values that are capable of being output from the first PA, which is controlled envelope tracking (ET).

10. The electronic device of claim 1, wherein the control circuit is configured to obtain the third value by adding the second value to the first value.

11. An electronic device comprising:
a plurality of antennas comprising a first antenna and a second antenna;
a radio frequency front end (RFFE), connected with the first antenna through a first electric path and connected with the second antenna through a second electrical path, comprising a first power amplifier (PA) for the first antenna and a second PA for the second antenna; and
a control circuit operably coupled with the RFFE, configured to:
identify a first value that is a target transmit (Tx) power of a sounding reference signal (SRS) to be transmitted to a base station;

identify a second value that is a power loss value caused when providing, through the first electric path to the first antenna, the SRS to be transmitted to the base station;

identify a third value for compensating a power lass caused when providing, through the second electric path to the second antenna, the SRS to be transmitted to the base station;

obtain a fourth value, based on the first value, the second value, and the third value;

in response to identifying that the fourth value is less than or equal to a reference value, transmit, to the base station through the second antenna, the SRS by using the PA outputting the fourth value; and in response to identifying that the fourth value is greater than the reference value, transmit, to the base station through the second antenna, the SRS by using the PA outputting the reference value.

12. The electronic device of claim 11, wherein the third value corresponds to a difference between a power loss value caused when providing the SRS through the first electric path to the first antenna and a power loss value caused when providing the SRS through the second electric path to the second antenna.

13. The electronic device of claim 11, wherein the first antenna from among the first antenna and the second antenna is used for transmitting at least one signal distinct from the SRS to an external electronic device, and wherein the second antenna from among the first antenna and the second antenna is used for receiving a signal from the external electronic device.

14. The electronic device of claim 11, wherein the control circuit is configured to:

on condition that a frequency used for the transmission of the SRS is within first range, identify a first candidate value from among a plurality of candidate values as the third value; and on condition that the frequency is within second range distinct from the first range, identify a second candidate value distinct from the first candidate value from among the plurality of candidate values as the third value.

15. The electronic device of claim 14, wherein the control circuit is configured to:

on condition that the frequency is within the first range, identify a first candidate reference value from among a plurality of candidate reference values as the reference value; and on condition that the frequency is within the second range, identify a second candidate reference value from among the plurality of candidate reference values as the reference value.

16. The electronic device of claim 11, wherein the control circuit is configured to:

on condition that a band used for the transmission of the SRS is a first band, identify a first candidate value from among a plurality of candidate values as the third value; and on condition that the band is a second band distinct from the first band, identify a second candidate value distinct from the first candidate value from among the plurality of candidate values as the third value.

17. The electronic device of claim 16, wherein the control circuit is configured to:

on condition that the band is the first band, identify, as the reference value, a first candidate reference value from among a plurality of candidate reference values; and on condition that the band is the second band, identify, as the reference value, a second candidate reference value distinct from the first candidate reference value from among the plurality of candidate reference values.

18. The electronic device of claim 11, wherein the control circuit is configured to:

on condition that the first value is within first range configured with first power values capable of outputting from the second PA controlled based on average power tracking (APT), identify the reference value as a first candidate reference value from among a plurality of candidate reference values; and on condition that the first value is within second range configured with second power values capable of outputting from the second PA controlled based on envelope tracking (ET), identify the reference value as a second candidate reference value from among the plurality of candidate reference values.

19. The electronic device of claim 11, wherein the control circuit is further configured to:

obtain a fifth value, based on the first value and the second value; and transmit, through the first antenna to the base station, the SRS by using the first PA outputting the fifth value.

20. An electronic device comprising:

an antenna;

a radio frequency front end (RFFE), connected with the antenna through an electric path, comprising a power amplifier (PA); and a control circuit, operably coupled with the RFFE, configured to:

on condition that a target transmit (Tx) power value of a sounding reference signal (SRS) to be transmitted through the antenna to a base station is within first range configured with values less than reference value, transmit, through the antenna to the base station, the SRS, based on controlling the PA to output power changed according to change of the target Tx power value; and on condition that the target Tx power value of the SRS to be transmitted through the antenna to the base station is within second range configured with values greater than or equal to the reference values, transmit, through the antenna to the base station, the SRS, based on controlling the PA to output power maintained independently from the change of the target Tx power value.

* * * * *